United States Patent
King-Shepard

(10) Patent No.: US 12,072,707 B2
(45) Date of Patent: Aug. 27, 2024

(54) CONFLICT DETECTION AND AVOIDANCE FOR A ROBOT BASED ON PERCEPTION UNCERTAINTY

(71) Applicant: Aurora Flight Sciences Corporation, Manassas, VA (US)

(72) Inventor: Ryan King-Shepard, Somerville, MA (US)

(73) Assignee: Aurora Flight Sciences Corporation, a subsidiary of The Boeing Company, Manassas, VA (US)

(*) Notice: Subject to any disclaimer, the term of this patent is extended or adjusted under 35 U.S.C. 154(b) by 228 days.

(21) Appl. No.: 17/572,328

(22) Filed: Jan. 10, 2022

(65) Prior Publication Data
US 2023/0221723 A1  Jul. 13, 2023

(51) Int. Cl.
G05D 1/00  (2024.01)
(52) U.S. Cl.
CPC ......... *G05D 1/0202* (2013.01); *G05D 1/0088* (2013.01); *G05D 1/02* (2013.01); *G05D 1/10* (2013.01)
(58) Field of Classification Search
CPC .......................... G01C 21/3841; G05D 1/0088
See application file for complete search history.

(56) References Cited

U.S. PATENT DOCUMENTS

| 8,463,461 B2 | 6/2013 | Estkowski et al. |
| 2017/0004406 A1* | 1/2017 | Aghamohammadi ...................... B25J 9/1666 |
| 2017/0199525 A1* | 7/2017 | Albaghajati ........... G01V 1/003 |
| 2018/0206392 A1* | 7/2018 | Matsuzaki ........... A01B 69/008 |
| 2019/0161274 A1 | 5/2019 | Paschall, II et al. |
| 2021/0103286 A1* | 4/2021 | Wang .................... G05D 1/0221 |
| 2022/0011776 A1* | 1/2022 | Narang ................ G05D 1/0088 |
| 2022/0315000 A1* | 10/2022 | Wray .................... G05D 1/0212 |

FOREIGN PATENT DOCUMENTS

DE   102019130172 A1 *  5/2021
WO   WO-2020069716 A1 *  4/2020  .............. B25J 13/08

OTHER PUBLICATIONS

Zhou, X. et al.; article entitled: UAV Collision Avoidance Based on Varying Cells Strategy; IEEE Transactions on Aerospace and Electronic Systems; Aug. 2019; pp. 1743-1755; vol. 55, No. 4.

(Continued)

*Primary Examiner* — Jaime Figueroa
*Assistant Examiner* — Benjamin J Brosh
(74) *Attorney, Agent, or Firm* — Quinn IP Law

(57) ABSTRACT

A method is provided for detecting and avoiding conflict during a mission of a robot that includes a global route of travel. The method includes monitoring a state of the robot and a state of an environment of the robot as the robot travels the global route. The method includes generating a local route of travel through a region of the environment that includes the robot, the region having a size and shape that are set based on a type of the robot and the state of the robot when the local route is generated. A measure of uncertainty in the perception of objects in the region is monitored based on the state of the environment. And the robot is caused to maintain the global route or transition to the local route based on a comparison of the measure of uncertainty and an uncertainty threshold.

25 Claims, 9 Drawing Sheets

(56) References Cited

OTHER PUBLICATIONS

Peralta et al., "A Comparison of Local Path Planning Techniques of Autonomous Surface Vehicles for Monitoring Applications: The Ypacarai Lake Case-study", MDPI, Jan. 2020, pp. 1-28.
Wikipedia, "Real-time path planning", Jun. 2020, retrieved from https://en.wikipedia.org/w/index.php?title=Real-time_path_planning&oldid=961142914, pp. 1-5.
Wikipedia, "Motion planning", Jun. 2020, retrieved from https://en.wikipedia.org/w/index.php?title=Motion_planning&oldid=962698400, pp. 1-9.
Patil et al., "Gaussian Belief Space Planning with Discontinuities in Sensing Domains", May 2014, 2014 IEEE International Conference on Robotics & Automation (ICRA), pp. 1-8.

\* cited by examiner

CONFLICT DETECTION AND AVOIDANCE FOR A ROBOT BASED ON PERCEPTION UNCERTAINTY

TECHNOLOGICAL FIELD

The present disclosure relates generally to robotics and, in particular, to one or more of the design, construction, operation or use of autonomous robots such as autonomous or semi-autonomous vehicles.

BACKGROUND

Many modern robots and other machines are designed to operate with increased autonomy and are less reliant on well-trained operators to safely operate. Some of these modern robots are manned while others are unmanned in particular, a variety of unmanned vehicles include unmanned ground vehicles (UGVs), unmanned aerial vehicles (UAVs), unmanned surface vehicles (USVs), unmanned underwater vehicles (UUVs), unmanned spacecraft and the like. The use of unmanned vehicles has grown in recent years and these unmanned vehicles are employed in a wide variety of applications, including both military and civilian uses.

One focus in the field of robotics is in the improvement of autonomy, which often includes multiple aspects of robot operation. These aspects of robot operation include automatic control of a given robot to support remote human control. Another aspect is optimization systems (and associated methods) to determine how, for a given robot or set of robots, tasks should be ordered and/or allocated. And yet another aspect of robot operation is automatic, real-time or near real-time data processing, and exploitation in support of automatic route planning, mission execution and other activities.

Despite advancements, existing autonomy systems are typically configured to address only one aspect of these activities, thereby focusing its design of the underling autonomy algorithms and software architecture on a narrow mission set. This limits the extensibility of existing autonomy systems. Furthermore, it is generally desirable to improve existing systems to enhance their efficiency and operation.

It would therefore be desirable to have a system and method that takes into account at least some of the issues discussed above, as well as other possible issues.

BRIEF SUMMARY

Example implementations of the present disclosure are directed to conflict detection and avoidance during a mission of a robot that includes a global route of travel. Some example implementations include perception of one or more objects in a region that includes the robot, and that has a size and shape that are set based on a type of the robot and the state of the robot, and that may dynamically change with the state of the robot. A local route through the region may be generated; and when uncertainty in the perception of the one or more objects in the region exceeds an uncertainty threshold, the robot may be caused to transition from the global route to the local route. The robot may thereafter be caused to return to the global route when the uncertainty decreases to less than the uncertainty threshold.

The present disclosure thus includes, without limitation, the following example implementations.

Some example implementations provide an apparatus for detecting and avoiding conflict during a mission of a robot that includes a global route of travel, the apparatus comprising: a memory configured to store computer-readable program code; and processing circuitry configured to access the memory, and execute the computer-readable program code to cause the apparatus to at least: monitor a state of the robot and a state of an environment of the robot as the robot travels the global route, the state of the environment including a perception of one or more objects in the environment; generate a local route of travel through a region of the environment that includes the robot, the region and thereby the local route of travel that is generated being updated as the robot travels the global route, the region having a size and shape that are set based on a type of the robot and the state of the robot when the local route is generated; monitor a measure of uncertainty in the perception of the one or more objects in the region based on the state of the environment; and cause the robot to maintain the global route, or transition from the global route to the local route, based on a comparison of the measure of uncertainty and an uncertainty threshold.

Some example implementations provide a method of detecting and avoiding conflict during a mission of a robot that includes a global route of travel, the method comprising: monitoring a state of the robot and a state of an environment of the robot as the robot travels the global route, the state of the environment including a perception of one or more objects in the environment; generating a local route of travel through a region of the environment that includes the robot, the region and thereby the local route of travel that is generated being updated as the robot travels the global route, the region having a size and shape that are set based on a type of the robot and the state of the robot when the local route is generated; monitoring a measure of uncertainty in the perception of the one or more objects in the region based on the state of the environment; and causing the robot to maintain the global route, or transition from the global route to the local route, based on a comparison of the measure of uncertainty and an uncertainty threshold.

Some example implementations provide a computer-readable storage medium for detecting and avoiding conflict during a mission of a robot that includes a global route of travel, the computer-readable storage medium being non-transitory and having computer-readable program code stored therein that, in response to execution by processing circuitry, causes an apparatus to at least: monitor a state of the robot and a state of an environment of the robot as the robot travels the global route, the state of the environment including a perception of one or more objects in the environment; generate a local route of travel through a region of the environment that includes the robot, the region and thereby the local route of travel that is generated being updated as the robot travels the global route, the region having a size and shape that are set based on a type of the robot and the state of the robot when the local route is generated; monitor a measure of uncertainty in the perception of the one or more objects in the region based on the state of the environment; and cause the robot to maintain the global route, or transition from the global route to the local route, based on a comparison of the measure of uncertainty and an uncertainty threshold.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 3:
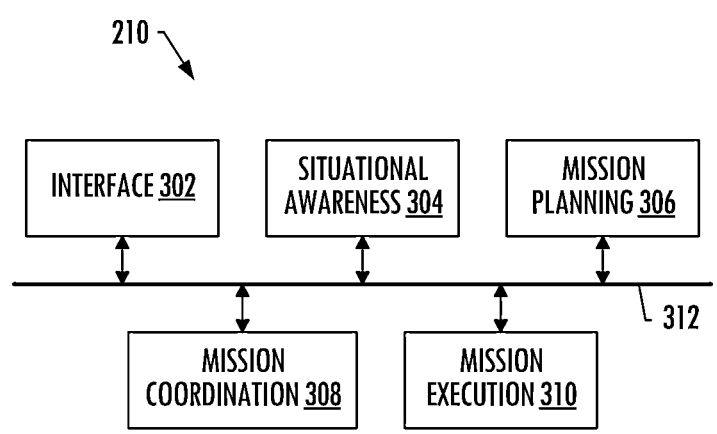
Figure 4:
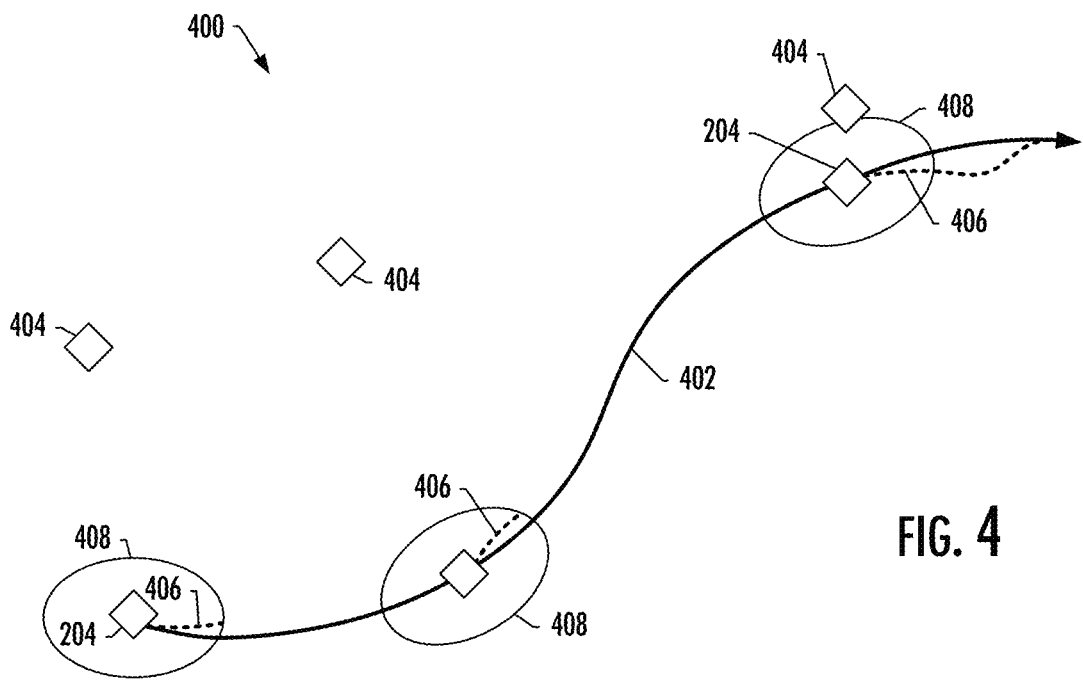
Figure 9A:
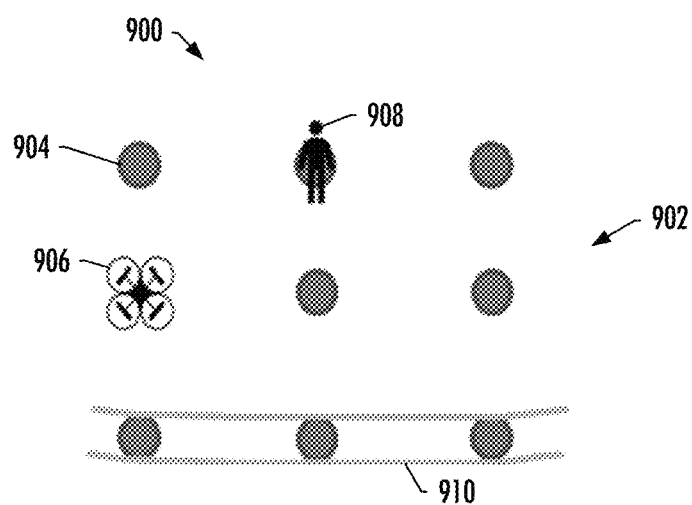
Figure 9B:
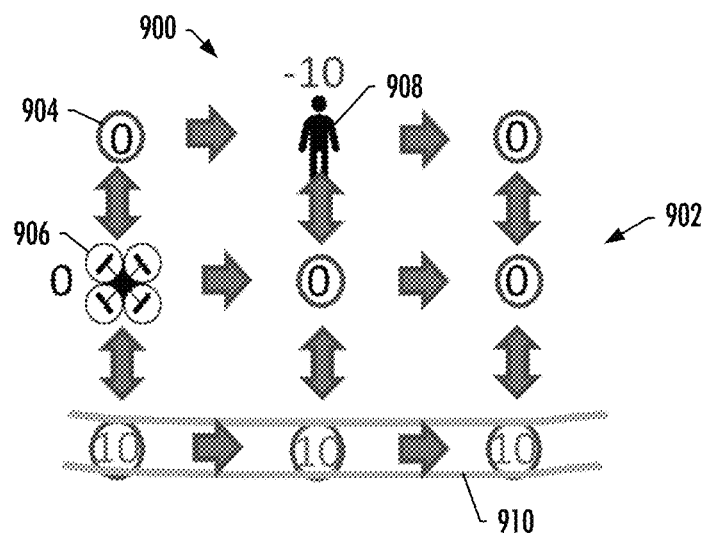
Figure 9C:
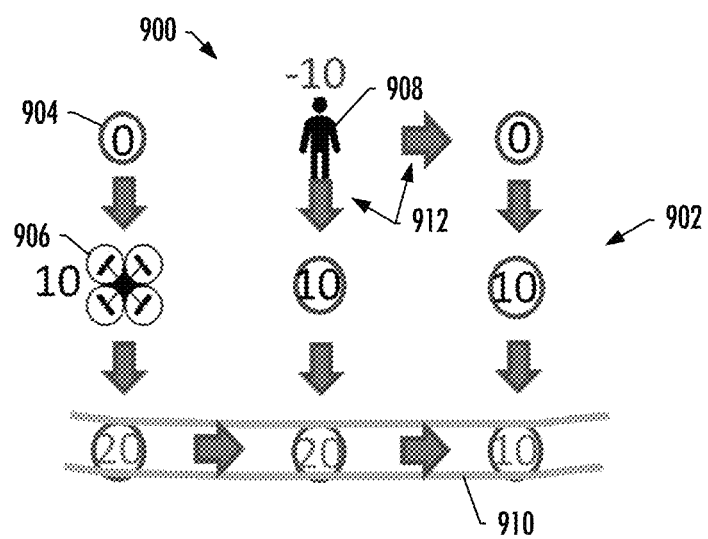
Figure 10A:
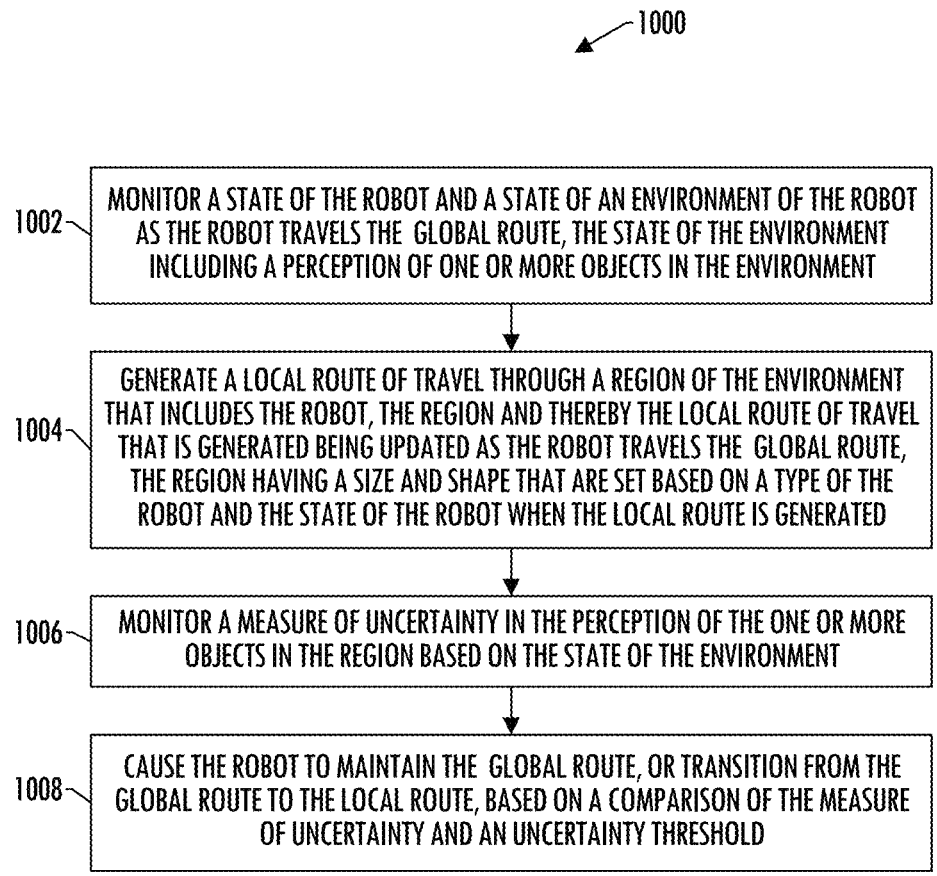
Figure 10B:
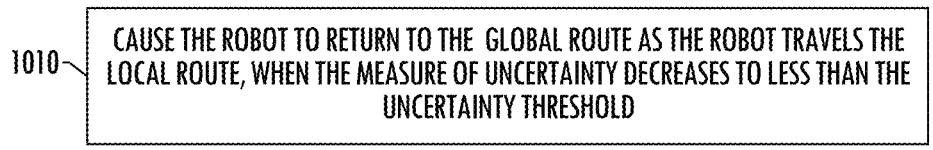
Figure 10C:
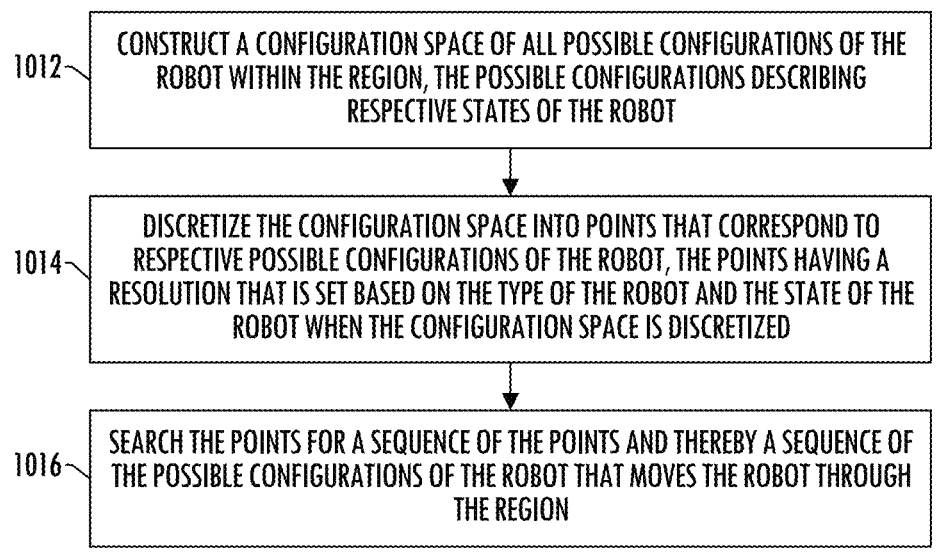
Figure 11:
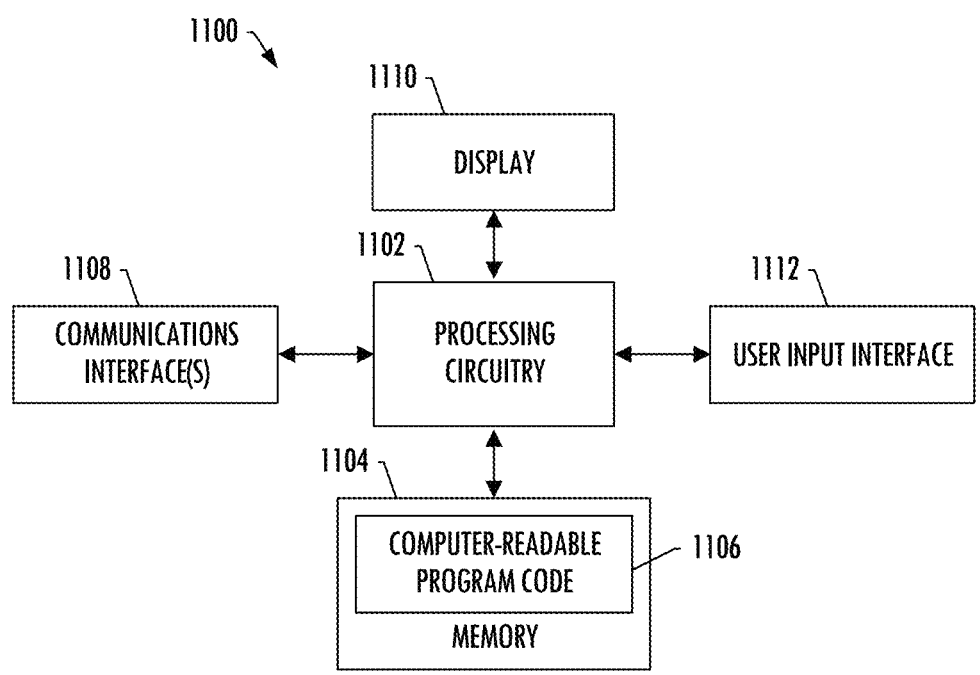

FIG. 3 more illustrates a mission management system (MMS) according to some example implementations;

FIG. 4 illustrates a scenario in which a robot is executing a mission that includes a global route of travel in an environment with one or more objects, according to some example implementations;

FIGS. 5, 6, 7 and 8 illustrate a configuration space of configurations of a robot, according to various example implementations;

FIGS. 9A, 9B and 9C illustrate a simple example for searching a configuration space, according to some example implementations;

FIGS. 10A, 10B and 10C are flowcharts illustrating various steps in a method of detecting and avoiding conflict during a mission of a robot that includes a global route of travel, according to various example implementations; and FIG. 11 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to robotics and, in particular, to one or more of the design, construction, operation or use of robots. As used herein, a robot is a machine designed and configurable to execute maneuvers in its environment. The robot may be manned or unmanned. The robot may be fully human-controlled, or the robot may be semi-autonomous or autonomous in which at least some of the maneuvers are executed independent of or with minimal human intervention. In some examples, the robot is operable in various modes with various amounts of human control.

A robot designed and configurable to fly may at times be referred to as an aerial robot. A robot designed and configurable to operate with at least some level of autonomy may at times be referred to as an autonomous robot, or an autonomous aerial robot in the case of an autonomous robot that is also designed and configurable to fly. Examples of suitable robots include aerobots, androids, automatons, autonomous vehicles, explosive ordnance disposal robots, hexapods, industrial robots, insect robots, microbots, nanobots, military robots, mobile robots, rovers, service robots, surgical robots, walking robots and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These may include autonomous cars, planes, trains, industrial vehicles, fulfillment center robots, supply-chain robots, robotic vehicles, mine sweepers, and the like.

Figure 1:
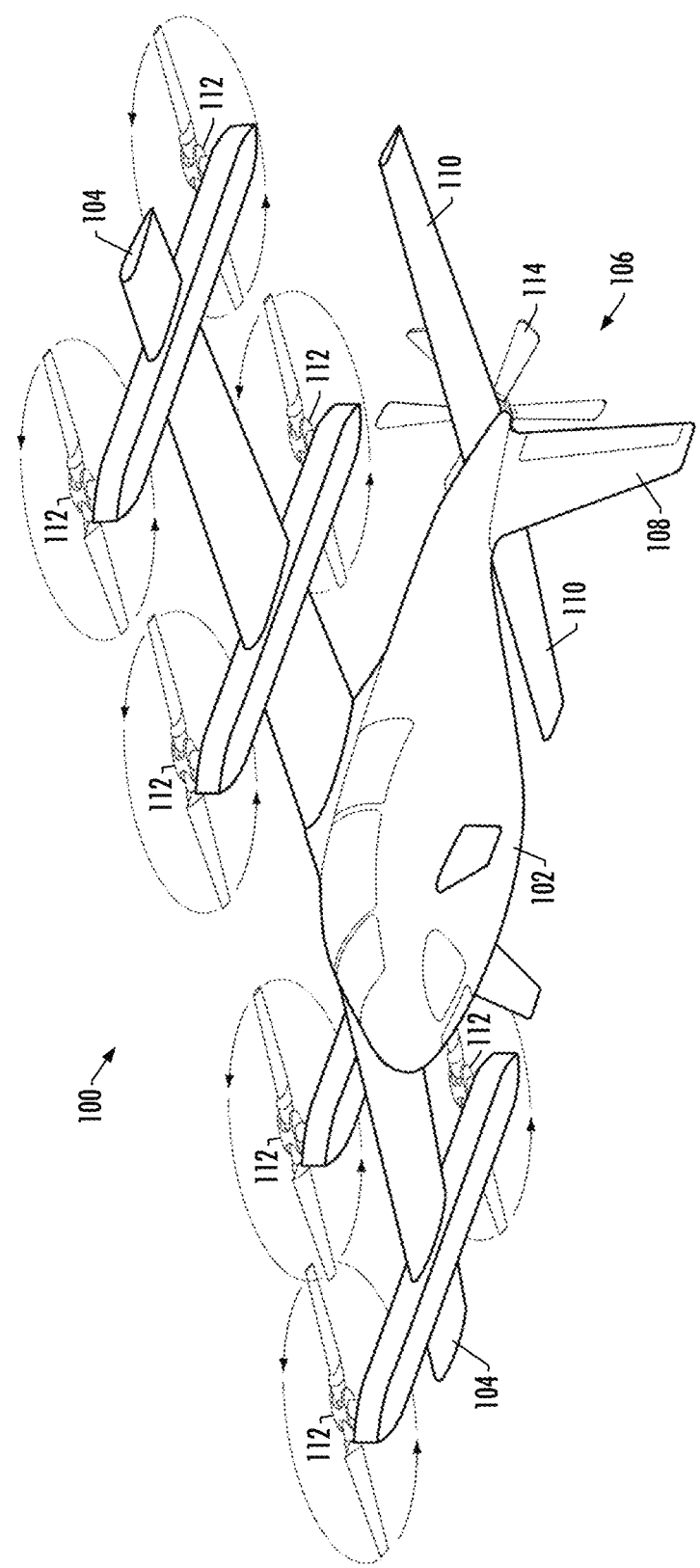
FIG. 1 illustrates one type of robot, namely, an unmanned aerial vehicle, that may benefit from example implementations of the present disclosure.

FIG. 1 illustrates one type of robot, namely, a UAV 100, that may benefit from example implementations of the present disclosure. As shown, the UAV generally includes a fuselage 102, wings 104 extending from opposing sides of the UAV in a mid-section of the fuselage, and an empennage or tail assembly 106 at a rear end of the fuselage. The tail assembly includes a vertical stabilizer 108 and two horizontal stabilizers 110 extending from opposing sides of the UAV. Rotors 112 and 114 are mounted to respectively the wings and the end of the tail assembly for lifting and propelling the UAV during flight.

Figure 2:
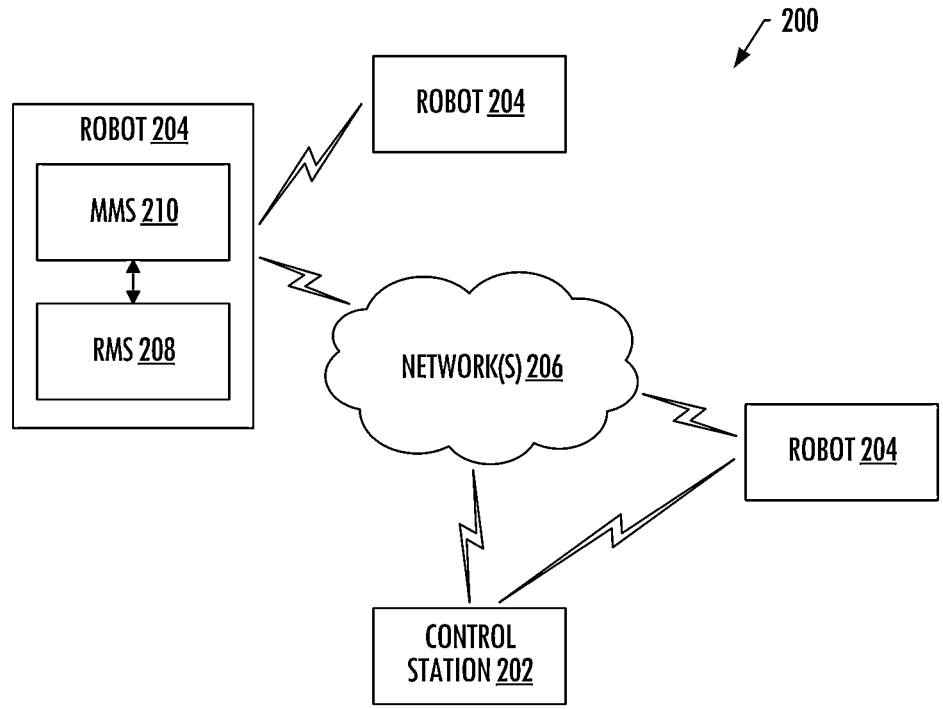
FIG. 2 illustrates a system according to some example implementations.

FIG. 2 illustrates a system 200 according to some example implementations of the present disclosure. The system may include any of a number of different subsystems (each an individual system) for performing one or more functions or operations. As shown, in some examples, the system includes a control station 202 and one or more robots 204 (e.g., one or more UAVs 100). The control station provides facilities for communication with or control of the one or more robots, such as by wired or wireless data links directly or across one or more networks 206. In some examples, the control station may be a ground station, and not in all cases control the robots. In this regard, the control station may be configured to monitor the robots. The control station may initiate mission, but the control station may not control the robots to maneuver. At times, then, the control station may enable or provide a distributed network/server of software functions.

The robot 204 includes a robot management system (RMS) 208 and a mission management system (MMS) 210. The RMS is a robot-specific subsystem configured to manage subsystems and other components of the robot. These subsystems and other components include, for example, maneuver controls, landing gear, onboard environmental systems, electrical, pneumatic and hydraulic systems, communications systems, navigation systems and other subsystems and components for controlling operation and maneuvering of the robot. The RMS is configured to accept maneuver commands such as waypoints and/or steering commands, and control the robot to follow those maneuver commands. In the context of a vehicle, the RMS is at times referred to as a vehicle management system (VMS).

The MMS 210 is a subsystem configured to manage missions of the robot 204. A mission is a deployment of the robot (one or more robots) to achieve one or more mission objectives. A mission may be decomposed into maneuvers of the robot with optional sensor and/or effector scheduling, and the MMS may execute tasks to manage the robot to execute maneuvers with specific parameters and capabilities. The MMS 210 includes subsystems to process sensor data to situational awareness, plan tasks for the robot 204 (or multiple robots), coordinate with teams to assign tasks, execute assigned tasks. The MMS is also configured to interface with the RMS 208, and in some examples the control station 202. Although the MMS is shown on the robot 204, the MMS may instead be at the control station; or in some examples, the MMS may be distributed between the robot and the control station.

In some examples, the MMS 210 provides a complete, end-to-end autonomy architecture with open system architecture standards and parameterized to allow rapid extension and reapplication to a variety of robots. The flexibility of the MMS enables an operator to code it once, but to apply it anywhere. The MMS may therefore be applied to virtually any robot that applies, or benefits from, autonomy. The MMS may include an adaptable autonomy architecture that is applicable to a variety of robots, including those identified above. A benefit of the MMS is therefore not only in the specific contents, but also in the specific details of the architecture, its subroutines, and in the interfaces between those subroutines and other systems/devices that support rapid extensibility and adaptability of the MMS to a variety of domains.

FIG. 3 more particularly illustrates the MMS 210 according to some example implementations of the present disclosure. The MMS may include any of a number of different subsystems (each an individual system) for performing one or more functions or operations. As shown, in some examples, the MMS includes an interface subsystem 302, a situational awareness subsystem 304, a mission planning subsystem 306, a mission coordination subsystem 308, and a mission execution subsystem 310. As suggested above, in some examples, the subsystems of the MMS may be on the robot 204, at the control station 202, or distributed between the robot and the control station. The subsystems may be configured to communicate with one another directly, over a communication bus 312, or across the network(s) 206 in examples in which the MMS is distributed between the robot and the control station.

The subsystems enable the MMS 210 of the robot 204 to interface with the system 200, perform situational awareness, plan a mission including a plurality of tasks, coordinate the plurality of tasks and thereby the mission with other robots 204, and execute the mission. For example, the MMS may use the interface subsystem 302 to interface with various sensors onboard the robot, the RMS 208, the control station 202 and/or other robots. The MMS may use the situational awareness subsystem 304 to acquire sensor data and maintain an awareness of the state of the environment in which the robot is operating. The MMS may use the mission planning subsystem 306 to plan a mission including or associated with a plurality of tasks, and which may incorporate rules of engagement, tactics and other constraints on operations. The MMS may likewise use the mission planning subsystem to dynamically replan a mission in which changes to the mission are made in real-time or near real-time as the mission is executed. The MMS may use the mission coordination subsystem 308 to coordinate the plurality of tasks of the mission with other robots and users, where agreed-upon tasks may then be executed by the MMS using the mission execution subsystem 310.

According to some example implementations of the present disclosure, the MMS 210 is also configured to implement software functionality or functionalities (at times referred to as services) during a mission to provide the robot 204 with conflict detection and avoidance capabilities. During a mission, the robot may take a path, and this path may be described by a series of waypoints that define a route the robot will travel. The robot travels with a velocity (speed and direction of motion), and the series of waypoints and velocities at that define the route with respect to time defines a trajectory of the robot (at times referred to as a track of the robot). The conflict detection and avoidance capabilities enable the robot to detect and avoid conflicts along its route of travel.

FIG. 4 illustrates a scenario 400 in which the robot 204 is executing a mission that includes a global route 402 of travel in an environment with one or more objects 404. In this regard, the global route may be a planned global route as part of the mission, or the global route may be identified as the mission is executed. The objects may be natural or man-made, stationary or moving; and in some examples, the moving objects include other robots that may be of the same type or different types than the robot. Other examples of suitable moving objects include non-robot vehicles such as any of a number of different types of ground vehicles, watercraft, aircraft, spacecraft or the like.

The situational awareness subsystem 304 is configured to monitor a state of the robot 204 and a state of the environment of the robot as the robot travels the global route 402. The state of the robot may be defined by the robot's pose (position and orientation), and in some examples, the robot's velocity. The state of the environment may be defined in a number of different manners, such as based on the one or more objects 404 in the environment, their number, size, congestion, stationary or moving, the presence of people in the environment, weather in the environment, and the like. In this regard, the state of the environment includes a perception of the objects in the environment. In some examples, the state of the environment is monitored using sensor data acquired from one or more sensors onboard the robot. Examples of suitable sensors include those employing technologies such as acoustics, radio, optics and the like. More particular examples of suitable sensors include those employing radar, lidar, infrared sensors, cameras and the like. Another example of a suitable sensor in the context of an aerial robot is an automatic, dependent surveillance-broadcast (ADS-B) receiver configured to receive ADS-B signals.

The mission execution subsystem 310 is configured to generate a local route 406 of travel through a region 408 of the environment that includes the robot. The region and thereby the local route of travel generated is updated as the robot travels the global route, and the region has a size and shape that are set based on a type of the robot and the state of the robot when the local route is generated.

The type of the robot 204 may indicate its capability to maneuver at different velocities over a number of time steps. The region 408 may have one shape for a type of robot that is limited to forward movement between time steps, and another shape for another type of robot with unlimited directional movement between time steps. Likewise, the region may have larger size for a type of robot with a slower reaction time, relative to another type of robot with a faster reaction time. Even further, the size and shape of the region may be set (and even dynamically change) based on the state of the robot such as its velocity. In particular, for example, region may increase in size and change its shape with an increase in the robot's velocity, the shape in some examples increasing in a dimension parallel with the robot's velocity vector.

The mission execution subsystem 310 is configured to monitor a measure of uncertainty in the perception of the one or more objects 404 in the region 408 based on the state of the environment. In some examples, the measure of uncertainty is determined based on a quantity of the objects 404 that are perceived in the region 408, and a measure of quality of the sensor data acquired from one or more sensors onboard the robot.

The mission execution subsystem 310 is configured to cause the robot 204 to maintain the global route 402, or transition from the global route to the local route 406, based on a comparison of the measure of uncertainty and an uncertainty threshold. This may include the MMS 210 configured to send one or more maneuver commands to the RMS 208 to control the robot to follow the maneuver commands and thereby execute the maneuver. In some examples, the robot is configured to maintain the global route when the measure of uncertainty is less than the uncertainty threshold, and transition from the global route to the local route when the measure of uncertainty is greater than the uncertainty threshold.

In some examples, the robot 204 is configured to transition from the global route 402 to the local route 406 when the measure of uncertainty is greater than the uncertainty threshold. In some of these examples, the mission execution subsystem 310 is further configured to cause the robot to return to the global route as the robot travels the local route, when the measure of uncertainty decreases to less than the uncertainty threshold. In this regard, the situational awareness subsystem 304 and mission execution subsystem 310 may continue as described above. And when the measure of uncertainty decreases to less than the uncertainty threshold, the mission execution subsystem may cause the robot to return to the global route.

Let $\tau_{sensor}$ represent the frequency of the slowest sensor from which sensor data is acquired to perceive objects 404; and let $\gamma_{thresh}$ represent the uncertainty threshold that may be user-defined, in some examples based on the sensor specification. The measure of uncertainty $\gamma$ may be determined as follows:

$$\gamma = \text{(number of objects perceived in the region)} \times \text{(number of discontinuities found in } \tau_{sensor}\text{)}$$

The mission execution subsystem 310 may be configured to cause the robot 204 to maintain the global route 402 when $\gamma < \gamma_{thresh}$ (or $\gamma \leq \gamma_{thresh}$), and transition from the global route to the local route 406 when $\gamma > \gamma_{thresh}$.

Figure 5:
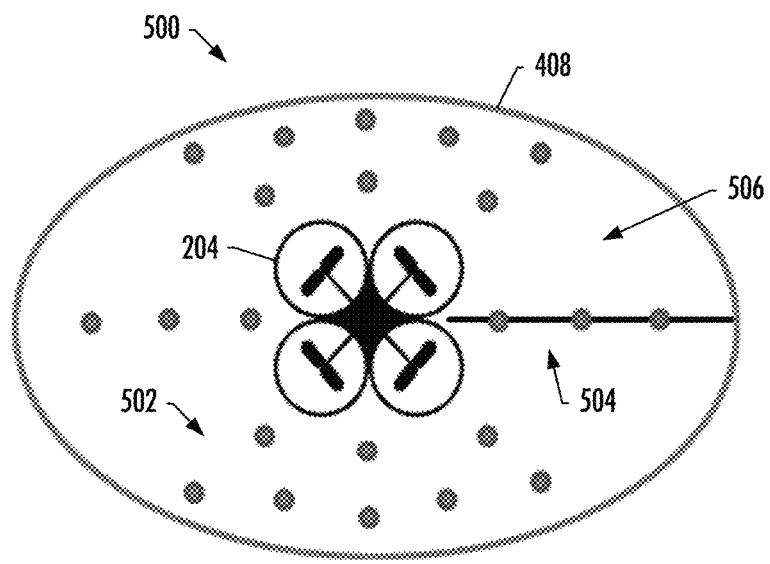

As shown in FIG. 5, in some examples, the mission execution subsystem 310 is configured to construct a configuration space 500 of all possible configurations of the robot 204 within the region 408. In the configuration space (also referred to as the C-space), the possible configurations describe respective states of the robot. The mission execution subsystem is configured to discretize the configuration space into points 502 that correspond to respective possible configurations of the robot. The points have a resolution that is set based on the type of the robot and the state of the robot when the configuration space is discretized. The mission execution subsystem, then, is configured to search the points for a sequence 504 of the points and thereby a sequence of the possible configurations of the robot that moves the robot through the region.

In some examples, the configuration space 500 is discretized into a grid 506 of points 502 that indicate the respective states of the robot 204. In some of these examples, the mission execution subsystem 310 is configured to implement a reward-based algorithm to search for the sequence 504 of points 502. The grid of points, then, may further indicate actions available to the robot to move between the respective states, and rewards given to the robot for taking respective ones of the actions. Some reward-based algorithms such as state-action-reward-state-action (SARSA) use a Markov decision process (MDP) that models the robot as an agent that interacts with its environment within the region 408, which is represented in the configuration space.

After the configuration space 500 is discretized into the grid 506 of points 502, the points are then searched for a sequence 504 of the points for a corresponding sequence of the respective states that maximizes an aggregate of the rewards given to the robot. In some further examples, the rewards are determined based on proximity of the respective states to the global route 402, and proximity to the objects 404 that are perceived in the region 408, such that the robot is biased toward the global route and away from the objects during the search of the points.

The region 408 and thereby the configuration space 500 and grid 506 of points 502 may be defined in a number of different manners. The region may be defined in two-dimensions (2D) or three-dimensions (3D). As an example, the region may be circular or spherical, elliptical or ellipsoidal, rectangular, cylindrical or cuboidal. As described herein, then, any reference to the region having a 2D shape may be equally applicable to the region in 3D, and vice versa.

As shown in FIGS. 4 and 5, the region 408 and thereby the configuration space 500 and grid 506 of points 502 has an elliptical (or ellipsoidal) shape that may be defined in a number of different manners. In some examples, the region is defined by perpendicular axes. In cases in which the region is circular, the axes may correspond to the diameter of the circle; otherwise, the axes may include a major axis and a minor axis. The major axis may parallel the velocity vector of the robot 204, and the minor axis may be perpendicular to the velocity vector. The major axis and minor axis may have configured maximums, minimums, or both maximums and minimums, that confine the size of the region. The grid may also have a configured resolution that sets the number of points in the configuration space.

Figure 6:
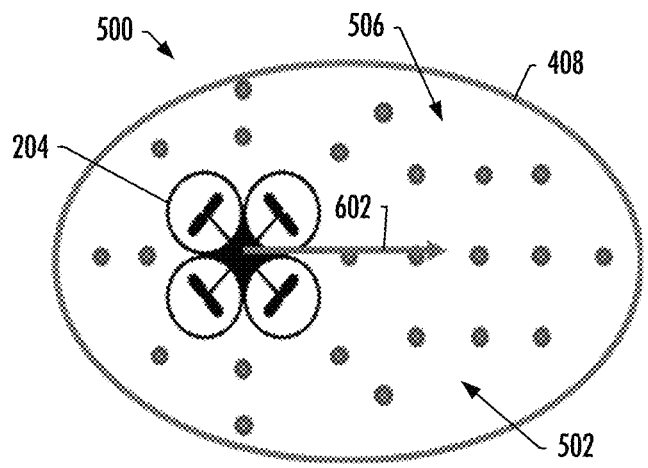
Figure 7:
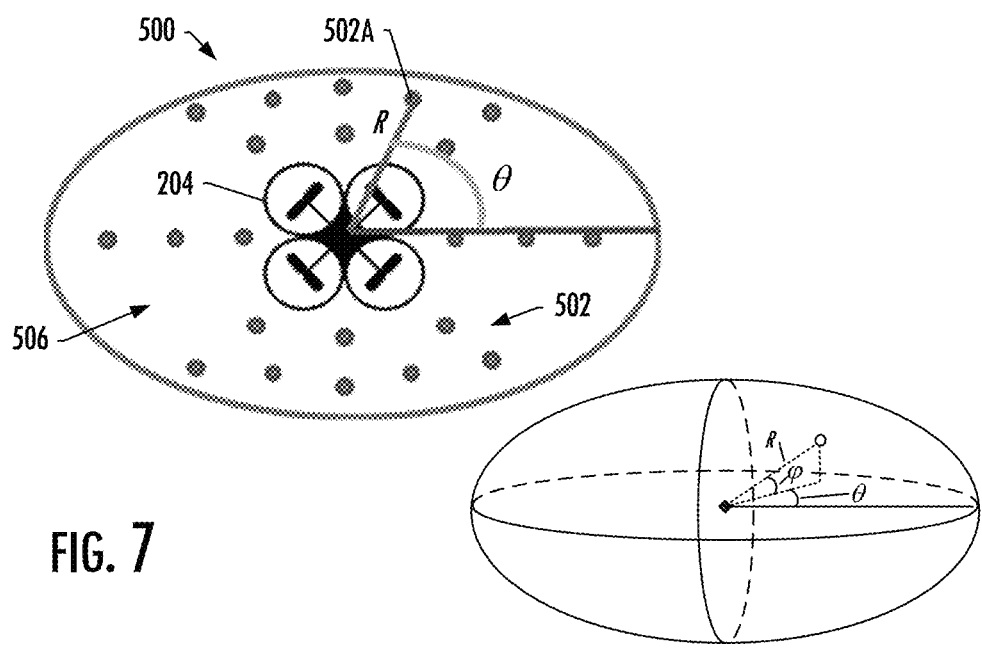
Figure 8:
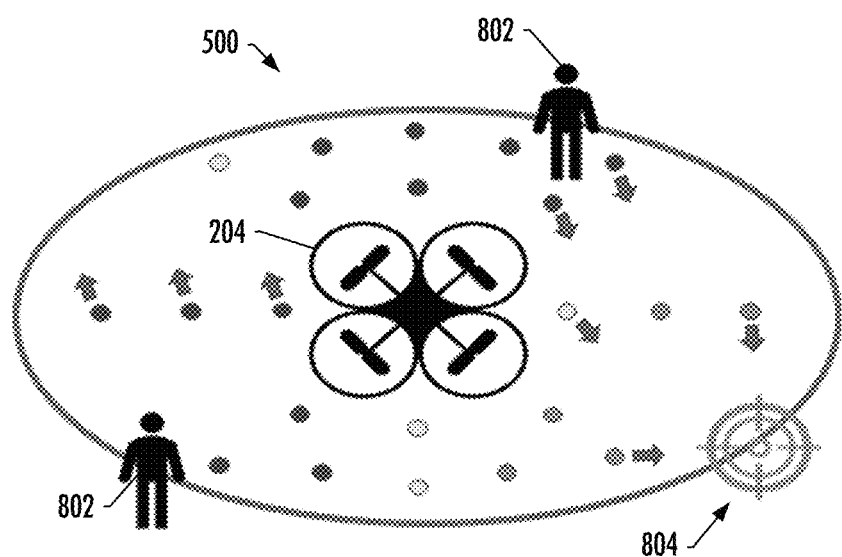

To further illustrate example implementations of the present disclosure, reference is now made to FIGS. 6-8, which illustrate a configuration space 500, according to various example implementations. In this regard, FIG. 6 illustrates the configuration space in which the grid 506 of points 502 is shifted toward a current direction of the robot 204; the faster the robot's velocity (represented in the figure by velocity vector 602), the more the grid may be shifted. The size of the major axis and thereby the configuration space may also increase as the velocity increases, until its maximum is reached (if configured). As also shown, the minor axis may compress as the major axis increases, until its minimum is reached (if configured).

The grid 506 of points 502 in the configuration space 500 may indicate states of the robot 204 in terms of distance R from center and angle θ from a forward orientation, as shown for a point 502A in FIG. 7. In 3D, the state may be further indicated by a further angle φ, as shown in an inset in FIG. 7. The actions may indicate maneuvers or maneuver commands to the RMS 208, and the rewards may indicate a desirability of the state based on a reward function. FIG. 8 illustrates an example of actions and rewards in which those points farther from objects 802 and closer to a waypoint 804 on the global route 402 have a higher reward, relative to those points closer to the objects and farther from the waypoint. Actions may be determined based on the value of the state. The value of a state may be a current reward plus the reward value of a next possible state; and the action with the highest value may be chosen and assigned to the state.

FIGS. 9A, 9B and 9C illustrate a simple example for searching a configuration space 900 including a grid 902 of nine points 904, a robot 906, an object 908 and a global route 910. According to some examples, initial rewards may be assigned based on a reward function, such as the following in the case of a simple reward function in which the reward R is determined based on whether the global route or the object is on a state s:

$R(s) = \forall s \in \text{Route}:10$ $\forall s \in \text{Object}:-10$

Else 0

The configuration space 900 is shown in FIG. 9A, and the configuration space with its initial rewards is shown in FIG. 9B.

For simplicity, movement of the robot 906 is constrained to up, down, left or right from a possible state, as shown by a point 904 in the configuration space 900. Once each state's initial reward has been determined, an action may be determined that maximizes the reward for the state. The value V of the reward at each state may be determined as the initial or current reward plus the maximum possible reward of the next state given an action a:

$V(s,a) = R(s) + \max_{\forall a: s \to s+1}(R(s+1))$

The grid 902 may now be updated with the best possible action from each state and the new values of each state, as shown in FIG. 9C. At this point, it may be seen that the robot maximizes its reward by moving downward toward the global route 910, and the process repeats.

As also shown in FIG. 9C, the state having the initial reward of −10 at the object 908 may have two actions 912 as both future states may be of equal value. The actions in the illustrated example have guaranteed execution; in a number of example implementations, the expected value of taking an action may be used instead of the state value. It is also worth noting that a number of operations in the illustrated example have been omitted for simplicity. A more detailed example may include the following:

1. Determine the initial reward of all states in a grid using the reward function.
2. Determine every possible action a state can take.
3. Determine the best action to take for each state in the grid.
4. Determine and verify vehicle location in the grid.
5. Output corresponding action.

FIGS. 10A-10C are flowcharts illustrating various steps in a method 1000 of detecting and avoiding conflict during a mission of a robot that includes a global route of travel, according to various example implementations of the present disclosure. The method includes monitoring a state of the robot and a state of an environment of the robot as the robot travels the global route, the state of the environment including a perception of one or more objects in the environment, as shown at block 1002 of FIG. 10A. The method includes generating a local route of travel through a region of the environment that includes the robot, the region and thereby the local route of travel that is generated being updated as the robot travels the global route, the region having a size and shape that are set based on a type of the robot and the state of the robot when the local route is generated, as shown at block 1004. The method includes monitoring a measure of uncertainty in the perception of the one or more objects in the region based on the state of the environment, as shown at block 1006. And the method includes causing the robot to maintain the global route, or transition from the global route to the local route, based on a comparison of the measure of uncertainty and an uncertainty threshold, as shown at block 1008.

In some examples, the robot is caused to maintain the global route when the measure of uncertainty is less than the uncertainty threshold, and transition from the global route to the local route when the measure of uncertainty is greater than the uncertainty threshold.

In some examples, the robot is caused to transition from the global route to the local route when the measure of uncertainty is greater than the uncertainty threshold, and In some of these examples, the method further includes causing the robot to return to the global route as the robot travels the local route, when the measure of uncertainty decreases to less than the uncertainty threshold, as shown at block 1010 of FIG. 10B.

In some examples, the state of the environment is monitored using sensor data acquired from one or more sensors onboard the robot, and the measure of uncertainty is determined based on a quantity of the one or more objects that are perceived in the region, and a measure of quality of the sensor data.

In some examples, generating the local route of travel at block 1004 includes constructing a configuration space of all possible configurations of the robot within the region, the possible configurations describing respective states of the robot, as shown at block 1012 of FIG. 10C. The method includes discretizing the configuration space into points that correspond to respective possible configurations of the robot, the points having a resolution that is set based on the type of the robot and the state of the robot when the configuration space is discretized, as shown at block 1014. And the method includes searching the points for a sequence of the points and thereby a sequence of the possible configurations of the robot that moves the robot through the region, as shown at block 1016.

In some examples, the configuration space is discretized into a grid of points that indicate the respective states of the robot, and that further indicate actions available to the robot to move between the respective states, and rewards given to the robot for taking respective ones of the actions. In some of these examples, the points are searched for a sequence of the points for a corresponding sequence of the respective states that maximizes an aggregate of the rewards given to the robot.

In some examples, the rewards are determined based on proximity of the respective states to the global route, and proximity to the one or more objects that are perceived in the region, such that the robot is biased toward the global route and away from the one or more objects during the search of the points.

According to example implementations of the present disclosure, the MMS 210 and its subsystems including the interface subsystem 302, situational awareness subsystem 304, mission planning subsystem 306, mission coordination subsystem 308 and mission execution subsystem 310 may be implemented by various means. Means for implementing the MMS and its subsystems may include hardware, alone or under direction of one or more computer programs from a computer-readable storage medium. In some examples, one or more apparatuses may be configured to function as or otherwise implement the MMS and its subsystems shown and described herein. In examples involving more than one apparatus, the respective apparatuses may be connected to or otherwise in communication with one another in a number of different manners, such as directly or indirectly via a wired or wireless network or the like.

FIG. 11 illustrates an apparatus 1100 according to some example implementations of the present disclosure. Generally, an apparatus of exemplary implementations of the present disclosure may comprise, include or be embodied in one or more fixed or portable electronic devices. The apparatus may include one or more of each of a number of components such as, for example, processing circuitry 1102 (e.g., processor unit) connected to a memory 1104 (e.g., storage device).

The processing circuitry 1102 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1104 (of the same or another apparatus).

The processing circuitry 1102 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1104 is generally any piece of computer hardware that is capable of storing information such as, for example, data, computer programs (e.g., computer-readable program code 1106) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1104, the processing circuitry 1102 may also be connected to one or more interfaces for displaying, transmitting and/or receiving information. The interfaces may include a communications interface 1108 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1110 and/or one or more user input interfaces 1112 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1100 may include a processing circuitry 1102 and a computer-readable storage medium or memory 1104 coupled to the processing circuitry, where the processing circuitry is configured to execute computer-readable program code 1106 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An apparatus for detecting and avoiding conflict during a mission of a robot that includes a global route of travel, the apparatus comprising: a memory configured to store computer-readable program code; and processing circuitry configured to access the memory, and execute the computer-readable program code to cause the apparatus to at least: monitor a state of the robot and a state of an environment of the robot as the robot travels the global route, the state of the environment including a perception of one or more objects in the environment; generate a local route of travel through a region of the environment that includes the robot, the region and thereby the local route of travel that is generated being updated as the robot travels the global route, the region having a size and shape that are set based on a type of the robot and the state of the robot when the local route is generated; monitor a measure of uncertainty in the perception of the one or more objects in the region based on the state of the environment; and cause the robot to maintain the global route, or transition from the global route to the local route, based on a comparison of the measure of uncertainty and an uncertainty threshold.

Clause 2. The apparatus of clause 1, wherein the robot is caused to maintain the global route when the measure of uncertainty is less than the uncertainty threshold, and transition from the global route to the local route when the measure of uncertainty is greater than the uncertainty threshold.

Clause 3. The apparatus of clause 1 or clause 2, wherein the robot is caused to transition from the global route to the local route when the measure of uncertainty is greater than the uncertainty threshold, and wherein the processing circuitry is configured to execute the computer-readable program code to cause the apparatus to further cause the robot to return to the global route as the robot travels the local route, when the measure of uncertainty decreases to less than the uncertainty threshold.

Clause 4. The apparatus of any of clauses 1 to 3, wherein the state of the environment is monitored using sensor data acquired from one or more sensors onboard the robot, and the measure of uncertainty is determined based on a quantity of the one or more objects that are perceived in the region, and a measure of quality of the sensor data.

Clause 5. The apparatus of any of clauses 1 to 4, wherein the apparatus caused to generate the local route of travel includes the apparatus caused to: construct a configuration space of all possible configurations of the robot within the region, the possible configurations describing respective states of the robot; discretize the configuration space into points that correspond to respective possible configurations of the robot, the points having a resolution that is set based on the type of the robot and the state of the robot when the configuration space is discretized; and search the points for a sequence of the points and thereby a sequence of the possible configurations of the robot that moves the robot through the region.

Clause 6. The apparatus of clause 5, wherein the configuration space is discretized into a grid of points that indicate the respective states of the robot, and that further indicate actions available to the robot to move between the respective states, and rewards given to the robot for taking respective ones of the actions, and wherein the points are searched for a sequence of the points for a corresponding sequence of the respective states that maximizes an aggregate of the rewards given to the robot.

Clause 7. The apparatus of clause 6, wherein the rewards are determined based on proximity of the respective states to the global route, and proximity to the one or more objects that are perceived in the region, such that the robot is biased toward the global route and away from the one or more objects during the search of the points.

Clause 8. A method of detecting and avoiding conflict during a mission of a robot that includes a global route of travel, the method comprising: monitoring a state of the robot and a state of an environment of the robot as the robot travels the global route, the state of the environment including a perception of one or more objects in the environment; generating a local route of travel through a region of the environment that includes the robot, the region and thereby the local route of travel that is generated being updated as the robot travels the global route, the region having a size and shape that are set based on a type of the robot and the state of the robot when the local route is generated; monitoring a measure of uncertainty in the perception of the one or more objects in the region based on the state of the environment; and causing the robot to maintain the global route, or transition from the global route to the local route, based on a comparison of the measure of uncertainty and an uncertainty threshold.

Clause 9. The method of clause 8, wherein the robot is caused to maintain the global route when the measure of uncertainty is less than the uncertainty threshold, and transition from the global route to the local route when the measure of uncertainty is greater than the uncertainty threshold.

Clause 10. The method of clause 8 or clause 9, wherein the robot is caused to transition from the global route to the local route when the measure of uncertainty is greater than the uncertainty threshold, and wherein the method further comprises causing the robot to return to the global route as the robot travels the local route, when the measure of uncertainty decreases to less than the uncertainty threshold.

Clause 11. The method of any of clauses 8 to 10, wherein the state of the environment is monitored using sensor data acquired from one or more sensors onboard the robot, and the measure of uncertainty is determined based on a quantity of the one or more objects that are perceived in the region, and a measure of quality of the sensor data.

Clause 12. The method of any of clauses 8 to 11, wherein generating the local route of travel comprises: constructing a configuration space of all possible configurations of the robot within the region, the possible configurations describing respective states of the robot; discretizing the configuration space into points that correspond to respective possible configurations of the robot, the points having a resolution that is set based on the type of the robot and the state of the robot when the configuration space is discretized; and searching the points for a sequence of the points and thereby a sequence of the possible configurations of the robot that moves the robot through the region.

Clause 13. The method of clause 12, wherein the configuration space is discretized into a grid of points that indicate the respective states of the robot, and that further indicate actions available to the robot to move between the respective states, and rewards given to the robot for taking respective ones of the actions, and wherein the points are searched for a sequence of the points for a corresponding sequence of the respective states that maximizes an aggregate of the rewards given to the robot.

Clause 14. The method of clause 13, wherein the rewards are determined based on proximity of the respective states to the global route, and proximity to the one or more objects that are perceived in the region, such that the robot is biased toward the global route and away from the one or more objects during the search of the points.

Clause 15. A computer-readable storage medium for detecting and avoiding conflict during a mission of a robot that includes a global route of travel, the computer-readable storage medium being non-transitory and having computer-readable program code stored therein that, in response to execution by processing circuitry, causes an apparatus to at least: monitor a state of the robot and a state of an environment of the robot as the robot travels the global route, the state of the environment including a perception of one or more objects in the environment; generate a local route of travel through a region of the environment that includes the robot, the region and thereby the local route of travel that is generated being updated as the robot travels the global route, the region having a size and shape that are set based on a type of the robot and the state of the robot when the local route is generated; monitor a measure of uncertainty in the perception of the one or more objects in the region based on the state of the environment; and cause the robot to maintain the global route, or transition from the global route to the local route, based on a comparison of the measure of uncertainty and an uncertainty threshold.

Clause 16. The computer-readable storage medium of clause 15, wherein the robot is caused to maintain the global route when the measure of uncertainty is less than the uncertainty threshold, and transition from the global route to the local route when the measure of uncertainty is greater than the uncertainty threshold.

Clause 17. The computer-readable storage medium of clause 156, wherein the robot is caused to transition from the global route to the local route when the measure of uncertainty is greater than the uncertainty threshold, and wherein the computer-readable storage medium has further computer-readable program code stored therein that, in response to execution by the processing circuitry, causes the apparatus to further cause the robot to return to the global route as the robot travels the local route, when the measure of uncertainty decreases to less than the uncertainty threshold.

Clause 18. The computer-readable storage medium of any of clauses 15 to 17, wherein the state of the environment is monitored using sensor data acquired from one or more sensors onboard the robot, and the measure of uncertainty is determined based on a quantity of the one or more objects that are perceived in the region, and a measure of quality of the sensor data.

Clause 19. The computer-readable storage medium of any of clauses 15 to 18, wherein the apparatus caused to generate the local route of travel includes the apparatus caused to: construct a configuration space of all possible configurations of the robot within the region, the possible configurations describing respective states of the robot; discretize the configuration space into points that correspond to respective possible configurations of the robot, the points having a resolution that is set based on the type of the robot and the state of the robot when the configuration space is discretized; and search the points for a sequence of the points and thereby a sequence of the possible configurations of the robot that moves the robot through the region.

Clause 20. The computer-readable storage medium of clause 19, wherein the configuration space is discretized into a grid of points that indicate the respective states of the robot, and that further indicate actions available to the robot to move between the respective states, and rewards given to the robot for taking respective ones of the actions, and wherein the points are searched for a sequence of the points for a corresponding sequence of the respective states that maximizes an aggregate of the rewards given to the robot.

Clause 21. The computer-readable storage medium of clause 20, wherein the rewards are determined based on proximity of the respective states to the global route, and proximity to the one or more objects that are perceived in the region, such that the robot is biased toward the global route and away from the one or more objects during the search of the points.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for detecting and avoiding conflict during a mission of an aerial robot that includes a global route of travel, the apparatus comprising:
   a memory configured to store computer-readable program code; and
   processing circuitry configured to access the memory, and execute the computer-readable program code to cause the apparatus to at least:
   monitor a state of the aerial robot and a state of an environment of the aerial robot as the aerial robot travels the global route, the state of the environment including a perception of one or more objects in the environment;
   generate a local route of travel through a region of the environment that includes the aerial robot, the region and thereby the local route of travel that is generated being updated as the aerial robot travels the global route, the region having a size and shape that are adjustable based on a type of the aerial robot and the state of the aerial robot when the local route is generated;
   monitor a measure of uncertainty in the perception of the one or more objects in the region based on the state of the environment; and
   cause the aerial robot to maintain the global route, or transition from the global route to the local route, based on a comparison of the measure of uncertainty and an uncertainty threshold.

2. The apparatus of claim 1, wherein the aerial robot is caused to maintain the global route when the measure of uncertainty is less than the uncertainty threshold, and transition from the global route to the local route when the measure of uncertainty is greater than the uncertainty threshold.

3. The apparatus of claim 1, wherein the aerial robot is caused to transition from the global route to the local route when the measure of uncertainty is greater than the uncertainty threshold, and wherein the processing circuitry is configured to execute the computer-readable program code to cause the apparatus to further cause the aerial robot to return to the global route as the aerial robot travels the local route, when the measure of uncertainty decreases to less than the uncertainty threshold.

4. The apparatus of claim 1, wherein the state of the environment is monitored using sensor data acquired from one or more sensors onboard the aerial robot, and the measure of uncertainty is determined based on a quantity of the one or more objects that are perceived in the region, and a measure of quality of the sensor data.

5. The apparatus of claim 1, wherein the apparatus caused to generate the local route of travel includes the apparatus caused to:
   construct a configuration space of all possible configurations of the aerial robot within the region, the possible configurations describing respective states of the aerial robot;
   discretize the configuration space into points that correspond to respective possible configurations of the aerial robot, the points having a resolution that is set based on the type of the aerial robot and the state of the aerial robot when the configuration space is discretized; and
   search the points for a sequence of the points and thereby a sequence of the possible configurations of the aerial robot that moves the aerial robot through the region.

6. The apparatus of claim 5, wherein the configuration space is discretized into a grid of points that indicate the respective states of the aerial robot, and that further indicate actions available to the aerial robot to move between the respective states, and rewards given to the aerial robot for taking respective ones of the actions, and
   wherein the points are searched for a sequence of the points for a corresponding sequence of the respective states that maximizes an aggregate of the rewards given to the aerial robot.

7. The apparatus of claim 6, wherein the rewards are determined based on proximity of the respective states to the global route, and proximity to the one or more objects that are perceived in the region, such that the aerial robot is biased toward the global route and away from the one or more objects during the search of the points.

8. The apparatus of claim 1, wherein the state of the environment includes size of the objects, congestion of the objects, and weather conditions of the environment.

9. The apparatus of claim 1, wherein the state of the aerial robot includes a position of the aerial robot and an orientation of the aerial robot.

10. A method of detecting and avoiding conflict during a mission of an aerial robot that includes a global route of travel, the method comprising:
   monitoring a state of the aerial robot and a state of an environment of the aerial robot as the aerial robot travels the global route, the state of the environment including a perception of one or more objects in the environment;
   generating a local route of travel through a region of the environment that includes the aerial robot, the region and thereby the local route of travel that is generated being updated as the aerial robot travels the global route, the region having a size and shape that are adjustable based on a type of the aerial robot and the state of the aerial robot when the local route is generated;

monitoring a measure of uncertainty in the perception of the one or more objects in the region based on the state of the environment; and causing the aerial robot to maintain the global route, or transition from the global route to the local route, based on a comparison of the measure of uncertainty and an uncertainty threshold.

11. The method of claim 10, wherein the aerial robot is caused to maintain the global route when the measure of uncertainty is less than the uncertainty threshold, and transition from the global route to the local route when the measure of uncertainty is greater than the uncertainty threshold.

12. The method of claim 10, wherein the aerial robot is caused to transition from the global route to the local route when the measure of uncertainty is greater than the uncertainty threshold, and wherein the method further comprises causing the aerial robot to return to the global route as the aerial robot travels the local route, when the measure of uncertainty decreases to less than the uncertainty threshold.

13. The method of claim 10, wherein the state of the environment is monitored using sensor data acquired from one or more sensors onboard the aerial robot, and the measure of uncertainty is determined based on a quantity of the one or more objects that are perceived in the region, and a measure of quality of the sensor data.

14. The method of claim 10, wherein generating the local route of travel comprises:

constructing a configuration space of all possible configurations of the aerial robot within the region, the possible configurations describing respective states of the aerial robot;

discretizing the configuration space into points that correspond to respective possible configurations of the aerial robot, the points having a resolution that is set based on the type of the aerial robot and the state of the aerial robot when the configuration space is discretized; and searching the points for a sequence of the points and thereby a sequence of the possible configurations of the aerial robot that moves the aerial robot through the region.

15. The method of claim 14, wherein the configuration space is discretized into a grid of points that indicate the respective states of the aerial robot, and that further indicate actions available to the aerial robot to move between the respective states, and rewards given to the aerial robot for taking respective ones of the actions, and wherein the points are searched for a sequence of the points for a corresponding sequence of the respective states that maximizes an aggregate of the rewards given to the aerial robot.

16. The method of claim 15, wherein the rewards are determined based on proximity of the respective states to the global route, and proximity to the one or more objects that are perceived in the region, such that the aerial robot is biased toward the global route and away from the one or more objects during the search of the points.

17. The method of claim 10, wherein the state of the environment includes congestion of the objects and size of the objects.

18. The method of claim 10, wherein the region is three-dimensional, and wherein the state of the environment is monitored using sensor data acquired from one or more sensors onboard the aerial robot, and wherein the measure of uncertainty is determined based on a quantity of the objects that are perceived in the region, and a measure of quality of the sensor data.

19. A computer-readable storage medium for detecting and avoiding conflict during a mission of an aerial robot that includes a global route of travel, the computer-readable storage medium being non-transitory and having computer-readable program code stored therein that, in response to execution by processing circuitry, causes an apparatus to at least:

monitor a state of the aerial robot and a state of an environment of the aerial robot as the aerial robot travels the global route, the state of the environment including a perception of one or more objects in the environment;

generate a local route of travel through a region of the environment that includes the aerial robot, the region and thereby the local route of travel that is generated being updated as the aerial robot travels the global route, the region having a size and shape that are adjustable based on a type of the aerial robot and the state of the aerial robot when the local route is generated;

monitor a measure of uncertainty in the perception of the one or more objects in the region based on the state of the environment; and cause the aerial robot to maintain the global route, or transition from the global route to the local route, based on a comparison of the measure of uncertainty and an uncertainty threshold.

20. The computer-readable storage medium of claim 19, wherein the aerial robot is caused to maintain the global route when the measure of uncertainty is less than the uncertainty threshold, and transition from the global route to the local route when the measure of uncertainty is greater than the uncertainty threshold.

21. The computer-readable storage medium of claim 19, wherein the aerial robot is caused to transition from the global route to the local route when the measure of uncertainty is greater than the uncertainty threshold, and wherein the computer-readable storage medium has further computer-readable program code stored therein that, in response to execution by the processing circuitry, causes the apparatus to further cause the aerial robot to return to the global route as the aerial robot travels the local route, when the measure of uncertainty decreases to less than the uncertainty threshold.

22. The computer-readable storage medium of claim 19, wherein the state of the environment is monitored using sensor data acquired from one or more sensors onboard the aerial robot, and the measure of uncertainty is determined based on a quantity of the one or more objects that are perceived in the region, and a measure of quality of the sensor data.

23. The computer-readable storage medium of claim 19, wherein the apparatus caused to generate the local route of travel includes the apparatus caused to:

construct a configuration space of all possible configurations of the aerial robot within the region, the possible configurations describing respective states of the aerial robot;

discretize the configuration space into points that correspond to respective possible configurations of the aerial robot, the points having a resolution that is set based on the type of the aerial robot and the state of the aerial robot when the configuration space is discretized; and search the points for a sequence of the points and thereby a sequence of the possible configurations of the aerial robot that moves the aerial robot through the region.

24. The computer-readable storage medium of claim 23, wherein the configuration space is discretized into a grid of points that indicate the respective states of the aerial robot, and that further indicate actions available to the aerial robot to move between the respective states, and rewards given to the aerial robot for taking respective ones of the actions, and
wherein the points are searched for a sequence of the points for a corresponding sequence of the respective states that maximizes an aggregate of the rewards given to the aerial robot.

25. The computer-readable storage medium of claim 24, wherein the rewards are determined based on proximity of the respective states to the global route, and proximity to the one or more objects that are perceived in the region, such that the aerial robot is biased toward the global route and away from the one or more objects during the search of the points.

* * * * *

UNITED STATES PATENT AND TRADEMARK OFFICE
CERTIFICATE OF CORRECTION

PATENT NO. : 12,072,707 B2
APPLICATION NO. : 17/572328
DATED : August 27, 2024
INVENTOR(S) : Ryan King-Shepard Page 1 of 1

It is certified that error appears in the above-identified patent and that said Letters Patent is hereby corrected as shown below:

On the Title Page

Item (71) The Applicant: "Aurora Flight Sciences Corporation" should read --Aurora Flight Sciences Corporation, a subsidiary of The Boeing Company--

Signed and Sealed this
Tenth Day of December, 2024

Katherine Kelly Vidal
*Director of the United States Patent and Trademark Office*